Jan. 21, 1964  D. G. WILSON  3,119,057
TRANSISTORIZED STATIC STANDBY POWER SUPPLY
Filed Sept. 8, 1960  2 Sheets-Sheet 1

INVENTOR.
Douglas G. Wilson
BY
Robert E. Fowler
ATTORNEY

INVENTOR.
Douglas G. Wilson
BY Robert E. Fowler
ATTORNEY

United States Patent Office 3,119,057
Patented Jan. 21, 1964

3,119,057
TRANSISTORIZED STATIC STANDBY
POWER SUPPLY
Douglas G. Wilson, Kokomo, Ind., assignor to General
Motors Corporation, Detroit, Mich., a corporation of
Delaware
Filed Sept. 8, 1960, Ser. No. 54,622
9 Claims. (Cl. 321—19)

This invention relates to inverter means for converting direct current power into alternating current power and more particularly to transistorized static inverter means for accomplishing that result.

It is often necessary to provide means at power stations which can supply an alternating current load for a relatively short period of time in case there is a power failure from a battery source. Since the advent of transistors static inverters can be fabricated which do not occupy a great deal of space, do not contain moving parts and which are relatively free from service.

It is, therefore, an object in making the present invention to provide a standby inverter system for providing conventional 60 cycle alternating current power from a direct current battery source of 100 to 140 volts.

It is a further object in making this invention to provide transistorized static inverter means capable of supplying a well regulated 60 cycle output for standby purposes.

With these and other objects in view which will become apparent as the specification proceeds, my invention will be best understood by reference to the following specification and claims and the illustraitons in the accompanying drawings in which:

Figure 1:
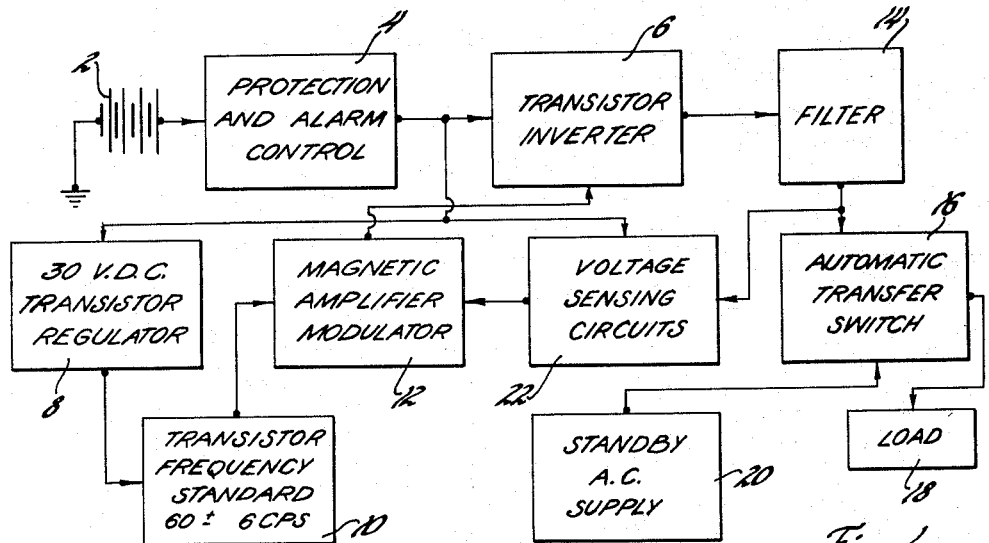
FIGURE 1 is a block diagram of a standby static inverter embodying my invention.

Referring now more particularly to FIG. 1 the inverter is illustrated energized by a source of direct current power which is diagrammatically shown as a battery 2 which is directly connected to a protection and alarm section 4. This section opens the circuit on over voltage, excess current or excess ambient temperature and makes sure that all is in proper order before inverter energization. The protection and alarm control system is directly connected to the transistor inverter section 6. Directly connected to the system following the protection and alarm control section 4 is a voltage regulator section 8 which is connected in series with a second regulator section to provide power for the transistor oscillator or frequency standard 10. The frequency standard section 10 is connected through a magnetic amplifier modulator 12 to the main inverter 6. The output of the main transistor inverter section 6 feeds through a filter section 14 and thence through an automatic transfer switch 16 to supply a load 18. There may be provided a standby A.C. power supply 20 which can be switched on to the line if it is available in lieu of using the inverter. Certain voltage sensing circuits for control and regulatory purposes shown at 22 are connected to the output of the filter and control the magnetic amplifier modulator due to instantaneous voltage or current variations at the inverter output. In general the system includes a source of direct current voltage which is carefully regulated and applied to an oscillator, the output of which oscillator is fed through magnetic amplifiers to alternately switch opposite arms of an inverter bridge and control the cross-flow to produce alternating current in an output line.

Figure 2A:
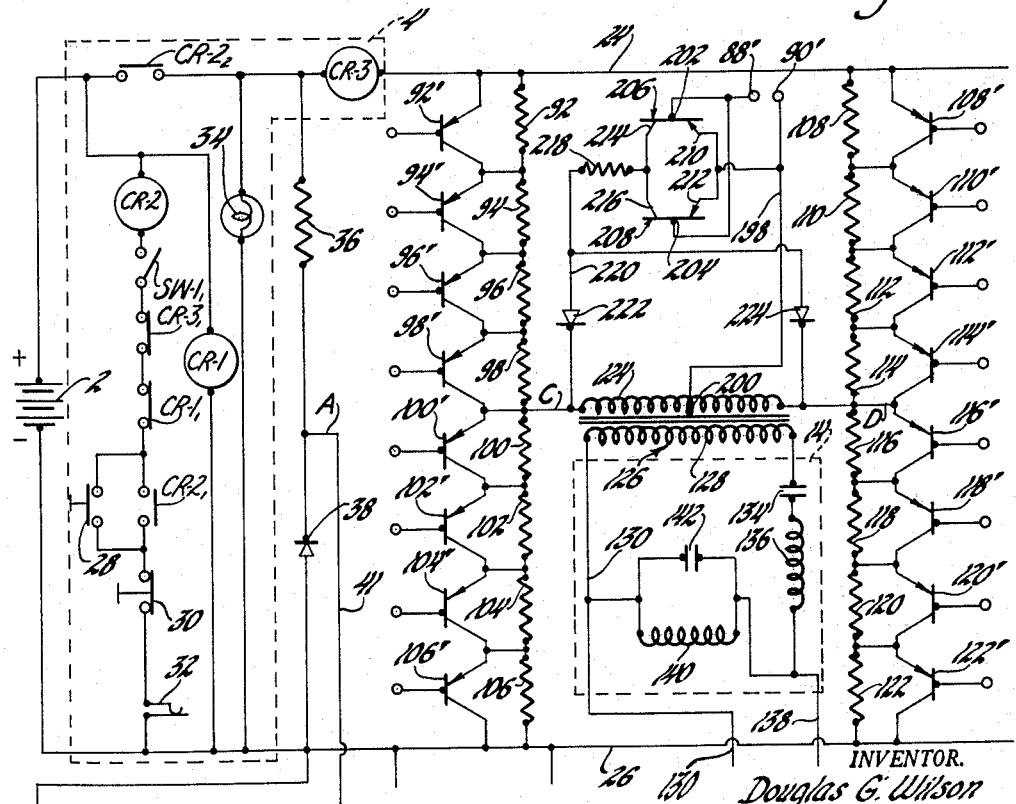
FIG. 2a is a portion of a complete circuit diagram of a static inverter embodying my invention.

With this background reference is now made first to FIG. 2a. FIG. 2a discloses a source of direct current power illustratively shown as battery 2 which is adapted to feed a pair of power lines 24 and 26. A control switch $CR-2_2$ is connected in series in power line 24 and controls the connection of the positive terminal of the battery to this line. Also connected in series in power line 24 is a current overload relay CR–3 which opens its contacts $CR-3_1$ for protective purposes when an excessive amount of current flows in this circuit. Connected directly across power lines 24 and 26 but ahead of switch contacts $CR-2_2$ is over voltage relay coil CR–1. In parallel with relay coil CR–1 is a circuit including a number of series elements which will be enumerated in sequence. The first element is control relay CR–2 in direct series connection with switch $SW-1_1$. This is a manually operated switch which is originally preset and will be described later. The second series of contacts in this chain are contacts $CR-3_1$ which are operated by the current overload relay CR–3 previously described and only opened under overload conditions. They normally remain closed. The third series of contacts are $CR-1_1$ which are normally closed contacts and are only opened when an excess voltage is applied to control relay CR–1 just described. Next below contacts $CR-1_1$ are normally open contacts $CR-2_1$ which are open until relay CR–2 is energized and then act as a holding circuit to keep this relay energized after initial closing. Starting switch 28 is shown in parallel with contact $CR-2_1$ and is a manual switch. This switch can be closed to initiate operation of the inverter and then can be released inasmuch as the holding circuit is then closed. The starting switch 28 may also, of course, be any other type of switch automatically operated which will accomplish the desired purpose. Next in order is an emergency stop switch 30 normally closed which can be manually opened to deenergize the whole system. Lastly in the series circuit is a thermostat overload switch 32 which is affected by ambient temperature, is normally closed but will open in the event of an excess temperature in the equipment.

Figure 2B:
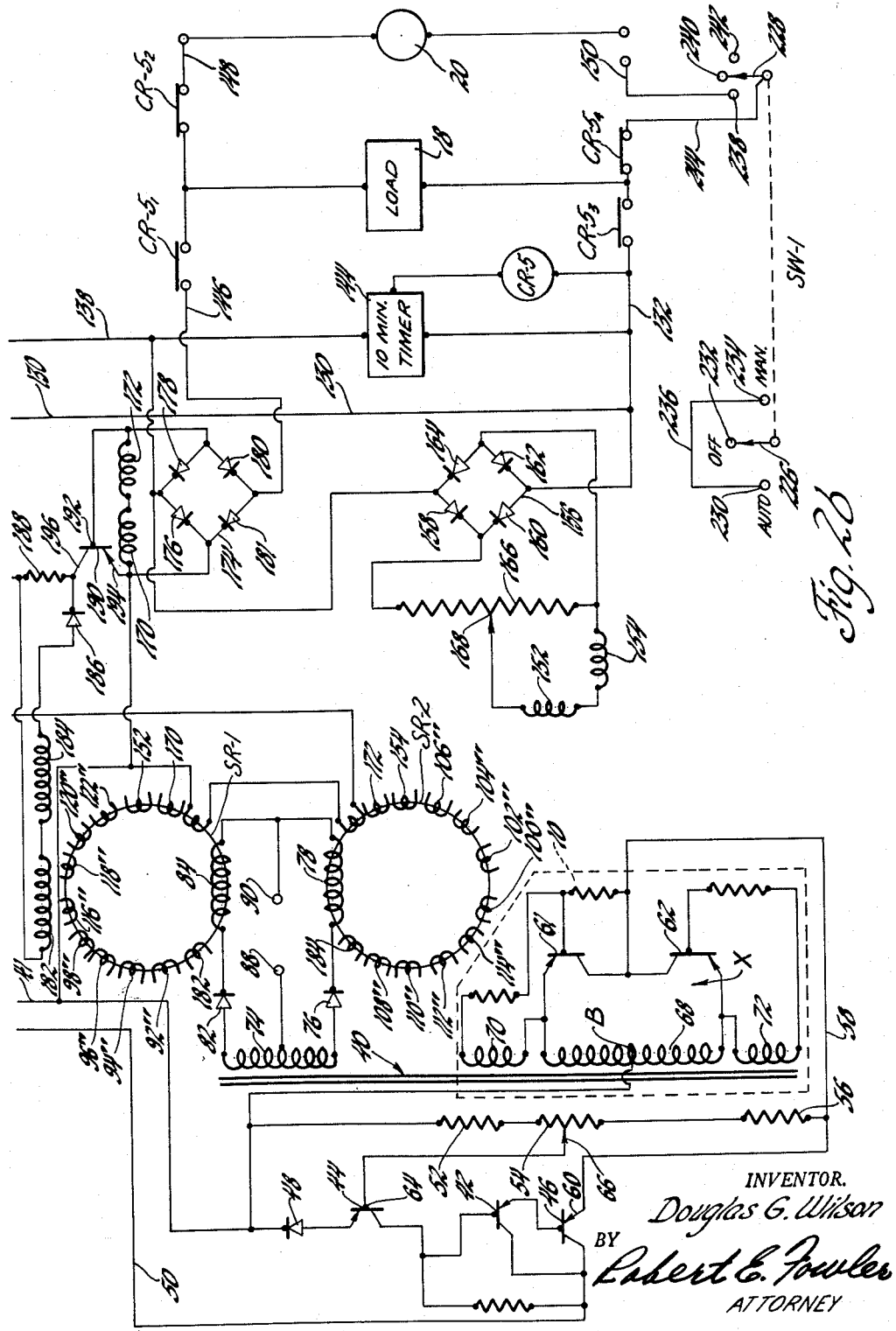
FIG. 2b is the remainder of a complete circuit diagram of a static inverter and when combined with FIG. 2a dicloses the complete inverter.

Pilot light 34 directly connected across lines 24 and 26 indicates the closure of switch contacts $CR-2_2$ and energization of the system. Resistance 36 in series with Zener diode 38 across power lines 24 and 26 act as a voltage regulating section and develop a regulated voltage at their intermediate point indicated at A. Power taken from point A is applied through a further regulating system and supplied to the transistor oscillator to provide a regulated 60 cycle output. To accomplish this conductive line 41 is shown connected to point A and also to the center tap B on transformer 40 associated with the transistor oscillator. That section just to the left of the transformer 40 in FIG. 2b is a regulatory system and consists of three transistors 42, 44 and 46 and a diode 48 connected together as shown and to a second power line 50 extending from the first D.C. power line 26. This combination of transistors and diodes provides a further regulated voltage across a voltage divider consisting of resistances 52, 54 and 56 in series. One end of this voltage divider is connected as shown to line 41 extending from point A and the other end is connected to line 58 extending from the emitter 60 of transistor 46 to the common collectors of transistors 61 and 62 of the oscillator indicated generally at X. The base electrode 64 of transistor 44 of the regulator section is connected to an adjustable tap 66 on resistance 54 for adjusting the amount of voltage applied to the oscillator.

The oscillator itself is of the push-pull type providing alternate conduction through the primary 68 from the two transistors 61 and 62, each transistor being controlled by feedback coil 70 and 72, respectively, which supplies the control voltage to the base electrodes. The output of the oscillator is taken from transformer 40 through a secondary winding 74 through a balanced circuit to magnetic amplifier control means. One terminal of the secondary winding 74 is connected through a first diode 76 to control winding 78 on a magnetic amplifier core SR–2 and the other end of secondary winding 74 is in like manner connected through a second diode 82 to control winding 84 on magnetic amplifier core SR–1. The opposite ends of the two windings 84 and 78 are commonly connected together. The secondary winding 74 is center tapped and connected to terminal 88 and the common connection between windings 84 and 78 is connected to a spaced terminal 90. The connections to these two points will be discussed at a later point since they involve a damping connection from the bridge circuit. The two magnetic amplifier cores SR–1 and SR–2 are each wound with a relatively large number of inductance coils, a part of which are utilized for control purposes and the remainder for switching purposes.

Before describing more in detail the magnetic amplifier and control portion of the circuit attention is now directed to the bridge control portion shown in FIG. 2a. The bridge consists of a plurality of resistances which form the usual four bridge arms together with a cross-connection. However, the resistances are separated into small sections and the flow of current through each section is controlled by a transistor in shunt therewith. One side of the bridge including two arms consists of resistances 92, 94, 96, 98, 100, 102, 104 and 106 in series between power lines 24 and 26. These resistances form the left half of the bridge. In like manner resistors 108, 110, 112, 114, 116, 118, 120 and 122 are connected in series between power lines 24 and 26 and form the righthand side of the bridge and provide the remaniing two arms. The cross-section between the two center members of the bridge is from a point intermediate resistances 98 and 100 at point designated C to a point intermediate resistances 114 and 116 at point D. In this cross-section there is coupled the primary 124 of the output transformer 126. In shunt with each of the resistances and in series with each other are a plurality of transistors identified by the reference character of its shunt resistance but with an additional prime. Thus transistor 92' is in shunt with resistance 92; 94' in shunt with resistance 94, etc.

It is now desired to point out that in this portion of the circuit the operation is to so switch the transistors on and off that the current may flow down one arm of the bridge, across the center cross-connection and down the other arm to the opposite power line in one half cycle and then reverse for the next half cycle to cause a reversal of current flow in the primary winding 124 of the output transformer 126 and induce a desired 60 cycle ouptut in secondary 128. In order to provide this conduction it is necessary to so trigger or make conductive the transistors shunting the indicated resistances at the proper times. These transistors are controlled by the magnetic amplifiers SR–1 and SR–2 and have their bases connected to windings on the magnetic amplifiers. When the saturation of the magnetic amplifier is changed the base bias will change to either turn on or turn off the transistor. Since it is necessary that the diagonal quadrant be conductive at the same time it is obvious that the coils connected to the bases of transistors 92', 94', 96' and 98' should be on the same magnetic amplifier core as those for transistors 116', 118', 120' and 122'. The controlling cores for these transistors will, therefore, be indicated by the same reference number, however this time with a double prime.

On FIG. 2b, therefore, and referring particularly to magnetic amplifier SR–1 the control bias coils 92″, 94″, 96″, 98″, 116″, 118″, 120″ and 122″ for transistors 92', 94', 96', 98', 116', 118', 120' and 122' are indicated as above described. Therefore, when the saturation of magnetic amplifier SR–1 is such as to cause the base bias on the indicated transistors to be such as to cause them to conduct, then the flow of current will be down the first arm or upper quarter on the lefthand side, across through the primary winding 124 and down through the fourth arm or lower quadrant on the righthand side. In like manner the control windings for the other eight transistors 108', 110', 112', 114', 100', 102', 104', and 106' are located on the magnetic amplifier core SR–2 and are indicated by the double prime of the same reference characters applied to the transistors. The application of current flowing in opposite directions through the primary winding 124 and transformer 126 will induce an alternating current in secondary winding 128 and assuming that the oscillator is running at an accurate 60 cycle rate the current so produced will be 60 cycle alternating current.

Connected to one terminal of the secondary 128 is an output line 130 which extends to the main output line 132. Connected to the opposite terminal of the secondary 128 for filter purposes is a filter condenser 134 in series with a filter choke 136, the opposite terminal of which is connected to conductive line 138. Also connected across between lines 130 and 138 for filtering purposes is inductance 140 in shunt to condenser 142. Line 138 extends to one terminal of a protective timer 144 the opposite terminal of which is connected to output line 132. The purpose of this protective timer is to prevent any connection of the load to the inverter until the inverter has had ample time to warm up. In this particular instance as illustrative only a ten minute interval has been provided. At the termination of that time after closure of the starting switch power is applied to relay CR–5 connected between the timer 144 and line 132. This control relay CR–5 actuates a plurality of contacts CR–5$_1$, CR–5$_2$, CR–5$_3$, and CR–5$_4$. Contacts CR–5$_1$ and CR–5$_3$ are in the output lines 132 and 146 to the load 18 and are normally open until the relay is energized at which time they close and complete the circuit. Thus the load cannot be connected until the inverter warms up. On the other hand relay contacts CR–5$_2$ and CR–5$_4$ are in an auxiliary standby A.C. line 148 and 150 and these are normally closed and are opened when the relay CR–5 is energized to remove any possible power input to the load from this source if it has been accidently left on.

Mention has been made of the fact that the transistor oscillator X is supplied with power which has been regulated at two different locations. There are also provided herein three different sections for regulating the output voltage. These are accomplished mainly by the addition of extra coils wound on the magnetic amplifiers SR–1 and SR–2. It is to be noted that at this point in the description there remain some four coils on each core that have not as yet been described. The first means for regulating the output voltage includes coils 152 and 154 associated with magnetic amplifiers SR–1 and SR–2, respectively. These two coils are specifically wound on their associated magnetic amplifiers to change the saturation to oppose rise or fall in voltage and thus regulate the voltage therein. They are connected in series across the output of a rectifier bridge 156 which is in turn connected across the secondary winding 128. This will be clear from noting that bridge 156 consists of four diodes 158, 160, 162 and 164. Output line 138 from transformer 126 is connected directly to one regulating bridge terminal between diodes 158 and 164 and the other output line 130 is connected to a common point between diode 160 and diode 162 providing an input to regulating bridge 156. Connected directly across the output of the bridge is a resistor 166. The resistance 166 is provided with a variably positionable tap 168 and the two voltage regulating coils 152 and 154 are connected in series across a portion of the resistance 166 depending upon the position of the adjustable tap 168. They, therefore, have applied thereto a voltage dependent upon the ouptut of the main transformer 126 and any variation in the output changes the flux in the cores of SR–1 and SR–2 to regulate the magnetic amplifiers.

A second regulatory means effected by the output of the main transformer 126 is that due to variations in load current. This means includes a regulatory bridge 174 which is connected in series with one of the output lines. The input to bridge 174 is, therefore, connected directly between load line 138 and line 146. The bridge consists of diodes 176, 178, 180 and 181. Line 138 is connected to a point intermediate diodes 176 and 178 and line 146 to a point intermediate diodes 180 and 181. Thus load current for the system flows directly through this bridge. Connected directly across the bridge are two regulatory coils 170 and 172 which are illustrated in the circuit and are likewise diagrammatically shown as being wound on magnetic amplifier cores SR–1 and SR–2, respectively. As the load current varies, therefore, the amount of current flowing through the bridge and these two coils will vary to change the saturation of the magnetic amplifiers and regulate the ouput thereover dependent upon load.

A last regulatory means might be called an overload regulating section and is provided to prevent the system from exceeding currents of more than two and one-half times normal. This portion of the system includes the last two coils wound on magnetic amplifiers SR–1 and SR–2 which are regulatory coils 182 and 184, respectively. These two coils are connected in series as shown at the top of FIG. 2b and are further connected in series with a Zener diode 186 in shunt across resistor 188 in the load circuit for transistor 190. The input to the transistor 190 is the voltage developed across current regulating coils 170 and 172 and is applied directly between the base electrode 192 and emitter 194 electrode of the transistor 190. The collector electrode 196 is connected directly through load resistance 188 to ground line 26. If, therefore, the load current tends to exceed two and one-half times its normal value the voltage developed across the bridge 174 is applied to the transistor 190 causing it to draw considerable current and a large voltage drop across resistance 188 and Zener diode 186 is designed to break down at a value equivalent to two and one-half times load. The saturating current flowing through coils 182 and 184 will regulate the magnetic amplifiers and prevent the current from exceeding that value.

It is to be noted that in FIG. 2b to this point no circuitry has been described as interconnecting terminals 88 and 90. These points are connected to terminals 88' and 90' in FIG. 2a. The purpose of this portion of the circuit is to provide a short circuit and damping action for the secondary 128 and its filter during the time interval in each half cycle when all the bridge transistors 92' through 122' are all non-conducting. It provides a discharge path for the collapsing of the fields for the energy stored in the filter at this time. This circuit consists of a conductor 198 extending from terminal 90' to a center tap 200 on primary winding 124 of transformer 126. Terminal 88' is commonly connected to base electrodes 202 and 204 of transistors 206 and 208, respectively. The emitter electrodes 210 and 212 of these two transistors are commonly connected to line 198. The collector electrodes 214 and 216 of transistors 206 and 208 are commonly connected through limiting resistance 218 to line 220. Diode 222 connects line 220 to one terminal of the primary 124 and diode 224 in a similar manner connects line 220 to the opposite terminal of primary 124.

Referring now to the switching means in the lower righthand portion of FIG. 2b there is disclosed therein a switch SW–1. As shown the switch includes a pair of ganged movable switch arms 226 and 228 which move together. The switch arm 226–228 are adapted to engage three contacts, one for automatic operation, one in the "Off" position, and a third for so-called manual operation. When the switch arms are in the left position the apparatus is set for automatic operation. When they are both in upright position the system is "Off" and when in the righthand position it is set for manual operation as indicated by the terminology applied to these various positions. Movable switch arm 226 engages stationary contacts 230, 232 and 234 in these three positions. Stationary contacts 230 and 234 are connected together electrically by conductor 236. It is to be noted that on FIG. 2a just below control relay CR–2 there is indicated a manually operable contact SW–1₁ which indicates the switch closed by arm 226 and, therefore, this switch is closed in either the automatic or manual position but open in the "Off" position. Rotatable switch arm 228 is similarly adapted to engage three stationary contacts 238, 240 and 242 as it moves with its ganged related arm. Rotatable contact 228 is connected by conductor 244 with one terminal of switch CR–5₄. Stationary contact 238 is connected by conductor 150 to one terminal across which A.C. power may be delivered. Thus when switch SW1 is placed in automatic position, switch SW–1₁ is closed to complete an energizing circuit as will be described and likewise the circuit is completed to the output across lines 148–150.

In operation, therefore, and assuming that switch SW–1 is placed in automatic position if it is desired to provide an emergency source of alternating current across a load 18 due to power failure or any other cause, either the operator manually closes switch 28 or this function may be performed automatically by a relay at some unattended station. Prior to the closure of switch 28 it will be noted that the series circuit including relay CR–2 is complete with the exception of the manual switch 28. Battery voltage is being applied across control relay CR–1 but this is an over-voltage relay and as long as only normal battery voltage is applied its contacts CR–1₁ remain closed. Upon the closure of switch 28, therefore, control relay CR–2 is energized through the following circuit; from one terminal of the battery through control relay CR–2 switch SW–1₁ normally closed contacts CR–3₁, normally closed contacts CR–1₁, switch 28, normally closed emergency switch 30 and normally closed ambient temperature switch 32 to the opposite side of the battery. The energization of control relay CR–2 causes it to close both sets of contacts actuated thereby, contacts CR–2₁ and CR–2₂. The closure of the first set of contacts closes a holding circuit to maintain the relay CR–2 energized and manual switch 28 may then be released. Closure of contacts CR–2₂ places power on main line 24. This turns on indicating light 34 and applies power to the remainder of the inverter system. It develops a regulated voltage of approximately 30 volts at point A if it is assumed that the battery source was 100 to 140 volts. This regulated voltage is then applied through lines 40 and 50 to further regulatory means and thence to oscillator X which is designed to operate at 60 cycles per second. At the same time it applies voltage across the inverter bridge circuit which can now be switched by the oscillator through the control of the various transistors 92' through 122'.

As the oscillator begins to operate and apply power to the main bridge transformer 126 and thence through the filter to the output the protective timer 144 is energized. This device will not permit energization of control relay CR–5 until the expiration of its set period which in this instance has been assumed to be ten minutes. Until that time, therefore, contacts CR–5₃ and CR–5₁ are open and no power from the inverter can be applied to the load. In the meantime the oscillator and the associated circuitry warms up and stabilizes so that at the termination of the warm up period the energization of control relay CR–5 closes contacts CR–5₁ and CR–5₃ and simultaneously opens contacts CR–5₂ and CR–5₄ applying power to the load 18.

The inverter bridge circuit is alternately switched each half cycle by the application of energizing pulses to the magnetic amplifiers SR–1 and SR–2 through the transformer secondary 74 and the controlling diodes 82 and 76. When one magnetic amplifier is energized or turned on to make the associated transistors connected to the control coils thereof, conductive, current will flow down through one arm of the bridge to the center tap, across through the primary and then down through the lower half on the opposite side to develop a primary pulse and induce a secondary voltage. In the next half cycle these transistors will be turned off and the diametrically opposite sets turned on to cause a reverse current flow in the primary to produce the next half cycle of output current. The secondary filter circuit filters the output and applies it to the load. As indicated a short circuit section is provided in the primary to absorb the collapse of all fields when all transistors are off at the instant of transition. This is provided by the circuit from terminals 88' and 99' through the push-pull transistors 206 and 208 and the diodes 222 and 224.

As the voltage on the secondary winding 128 tends to vary signals are developed across the voltage regulating bridge 156 and applied to control coils 152 and 154 to tend to oppose such change. In like manner, if the current tends to vary current regulating bridge 174 develops a voltage change across control coils 170 and 172 to again tend to change the saturation to negative any change. If by chance there is a sudden change in the current load, such as to cause it to rise to dangerous proportions, then Zener diode 186 will break down causing current flow through additional control windings 182 and 184 to prevent the current from exceeding a given value.

If the demand for standby alternating current power ceases then switch 30 can be actuated causing relay CR–2 to drop out and deenergize the whole system. This deenergizes control relay CR–5 and contacts CR–$5_1$ and CR–$5_3$ open to cut off the static inverter from the load. At the same time contacts CR–$5_2$ and CR–$5_4$ close to reconnect the load to an outside source of alternating current power if such is available. As earlier mentioned, if through some unforeseen circumstance the voltage across lines 24 and 26 exceeds a given value then control relay CR–1 is energized and caused to open its contacts CR–$1_1$ to drop out the whole system. Likewise if there is a current over-load on the major system, control relay CR–3 is energized to open its contacts CR–$3_1$ and also cause general deenergization of the whole system for protective purposes.

What is claimed is:

1. In inverter means, a source of direct current power, a bridge circuit having a plurality of arms and an input and an output circuit, transistor means connected in each arm and controlling the flow of current therethrough, a pair of magnetic amplifier means, control windings on each connected to the transistor means of diagonally opposite bridge circuit arms so that the application of pulses to one magnetic amplifier means will change the saturation of the magnetic amplifier means and control the flow in opposite transistor means, oscillator means connected to the source of direct current power and oscillating at the frequency of the desired output current, said oscillator means being connected to each of said pair of magnetic amplifier means to drive the same alternately and thus apply control voltages to the transistor means connected thereto and develop alternating current in the bridge output circuit.

2. In inverter means, a source of direct current power, a bridge circuit having a plurality of arms and an input and an output circuit, transistor means connected in each arm and controlling the flow of current therethrough, a pair of magnetic amplifier means, control windings on each connected to the transistor means of opposite bridge arms so that the application of pulses to one amplifier means will control the flow in diagonally opposite transistor means, oscillator means connected to the source of direct current power and oscillating at the frequency of the desired output current, said oscillator means being connected to each of said pair of magnetic amplifier means to drive the same alternately and apply control voltages to the transistor means and develop alternating current in the bridge circuit, and voltage regulating means connected to the output circuit of the bridge circuit including magnetizing coil means on the magnetic amplifier means to modify the saturation thereof and thus control the current flow through the bridge arms dependent upon changes in output voltage to tend to maintain the same constant.

3. In inverter means, a source of direct current power, a bridge circuit having a plurality of arms and an input and an output circuit, transistor means connected in each arm and controlling the flow of current therethrough, a pair of magnetic amplifier means, control windings on each connected to the transistor means of diagonally opposite bridge arms so that the application of pulses to one magnetic amplifier means will control the current flow in said diagonally opposite bridge arms, oscillator means connected to the source of direct current power and oscillating at the frequency of the desired output current, said oscillator means being connected to each of said pair of magnetic amplifier means to drive the same alternately and apply control voltages to the transistor means of opposite bridge arms and develop alternating current in the bridge output circuit, and voltage regulating means connected to the output circuit of the bridge circuit including additional magnetizing coil means on the magnetic amplifier means to modify the saturation thereof and thus control the current flow through the bridge arms dependent upon changes in output current to tend to maintain the output voltage constant.

4. In inverter means, a source of direct current power, a bridge circuit having a plurality of arms and an input and an output circuit, transistor means connected in each arm and controlling the flow of current therethrough, a pair of magnetic amplifier means, control windings on each connected to the transistor means of diagonally opposite bridge arms so that the application of pulses to one magnetic amplifier means will control the current flow in said diagonally opposite bridge arms, oscillator means connected to the source of direct current power and oscillating at the frequency of the desired output current, said oscillator means being connected to each of said pair of magnetic amplifier means to drive the same alternately and apply control voltages to the transistor means of opposite bridge arms and develop alternating current in the bridge output circuit, a plurality of voltage regulating means connected to the output circuit of the bridge including a plurality of magnetizing coil means on each of the magnetic amplifier means, a portion of which change the saturation of the amplifier means to modify the current flow through the bridge arms upon a variation in output voltage and the remainder to change the saturation of the amplifying means to modify the current flow through the bridge arms upon a variation in output current to tend to maintain a constant output voltage.

5. In inverter means, a source of direct current power, a bridge circuit having a plurality of arms and an input and an output circuit, transistor means connected in each arm and controlling the flow of current therethrough, a pair of magnetic amplifier means, control windings on each connected to the transistor means of diagonally opposite bridge arms so that the application of pulses to one magnetic amplifier means will control the current flow in said diagonally opposite bridge arms, oscillator means connected to the source of direct current power and oscillating at the frequency of the desired output current, said oscillator means being connected to each of said pair of magnetic amplifier means to drive the same alternately and apply control voltages to the transistor means of opposite bridge arms and develop alternating current in the bridge output circuit, a plurality of voltage regulating means connected to the output circuit of the bridge including a plurality of magnetizing coil means on each of the magnetic amplifier means, a portion of which change the saturation of the amplifier means to modify the current flow through the bridge arms upon a variation in output voltage and the remainder to change the saturation of amplifying means to modify the current flow through the bridge arms upon a variation in output current to tend to maintain a constant output voltage, and overload current regulating means connected to the portion of the magnetizing coils which change the saturation of the magnetic amplifier means upon a variation in load current including a set of further magnetizing coils on the magnetic amplifier means, and means connecting the set of further coils on the magnetic amplifier means to the portion of the magnetizing coils which change due to load current variation comprising an amplifier and diode means interconnecting the two sets of coils to prevent load current in exceeding a given value under any circumstances.

6. In inverter means, a source of direct current power, a bridge circuit having arms, an input and an output circuit, said source of direct current power being connected to said input circuit, a plurality of transistors connected into the arms of the bridge circuit to control the flow of current therethrough, each transistor having a control electrode the potential of which will control the flow of current through the transistor, a pair of magnetic amplifiers including core means, a series of coils mounted on one core means and connected to the control electrodes of the transistors in diagonally opposite arms of the bridge circuit to apply signal voltages to said transistors as the flux in the core means changes, a second series of coils mounted on the other core means and connected to the control electrodes of the transistors in the remaining two opposite arms, control windings on each core means, and oscillator means connected to the source of direct current power and to the control windings to alternately apply control pulses thereto from the oscillator to switch the bridge to produce alternating current in the bridge output circuit.

7. In inverter means, a source of direct current power, a bridge circuit having arms, an input and an output circuit, said source of direct current power being connected to said input circuit, a plurality of transistors connected into the arms of the bridge circuit to control the flow of current therethrough, each transistor having a control electrode the potential of which will control the flow of current through the transistor, a pair of magnetic amplifiers including core means, a series of coils mounted on one core means and connected to the control electrodes of the transistors in diagonally opposite arms of the bridge circuit to apply signal voltages to said transistors as the flux in the core means changes, a second series of coils mounted on the other core means and connected to the control electrodes of the transistors in the remaining two opposite arms, control windings on each core means, oscillator means connected to the source of direct current power, means interconnecting the oscillator output and the control windings including rectifier means to alternately apply control pulses to the magnetic amplifiers and switch the bridge arm conduction to produce alternating current in the bridge output circuit.

8. In inverter means, a source of direct current power, a bridge circuit having arms, an input and an output circuit, said source of direct current power being connected to said input circuit, a plurality of transistors connected into the arms of the bridge circuit to control the flow of current therethrough, each transistor having a control electrode the potential of which will control the flow of current through the transistor, a pair of magnetic amplifiers including core means, a series of coils mounted on one core means and connected to the control electrodes of the transistors in diagonally opposite arms of the bridge circuit to apply signal voltages to said transistors as the flux in the core means changes, a second series of coils mounted on the other core means and connected to the control electrodes of the transistors in the remaining two opposite arms, control windings on each core means, and oscillator means connected to the source of direct current power and to the control windings to alternately apply control pulses thereto from the oscillator to switch the bridge to produce alternating current in the bridge output circuit, a plurality of voltage regulating means connected to the output circuit of the bridge including a plurality of magnetizing coil means on each of the magnetic amplifier means, a portion of which change the saturation of the amplifier means to modify the flow through the bridge arms upon a variation in output voltage and the remainder to change the saturation of the amplifying means to modify the flow through the bridge arms upon a variation in output current to tend to maintain a constant output voltage.

9. In inverter means, a source of direct current power, a bridge circuit having arms, an input and an output circuit, said source of direct current power being connected to said input circuit, a plurality of transistors connected into the arms of the bridge circuit to control the flow of current therethrough, each transistor having a control electrode the potential of which will control the flow of current through the transistor, a pair of magnetic amplifiers including core means, a series of coils mounted on one core means and connected to the control electrodes of the transistors in diagonally opposite arms of the bridge circuit to apply signal voltages to said transistors as the flow in the core means changes, a second series of coils mounted on the other core means and connected to the control electrodes of the transistors in the remaining two opposite arms, control windings on each core means, and oscillator means connected to the source of direct current power and to the control windings on each core means to alternately apply control pulses thereto from the oscillator to switch the bridge circuit to produce alternating current in the bridge output circuit, a plurality of voltage regulating means connected to the output circuit of the bridge including a plurality of magnetizing coil means on each of the magnetic amplifier means, a portion of which change the saturation of each amplifier means to modify the flow through the bridge arms upon a variation in output voltage and the remainder to change the saturation of the amplifier means to modify the flow through the bridge arms upon a variation in output current to tend to maintain a constant output voltage, and short circuiting means connected across the bridge output and means connected to the oscillator output to absorb energy due to collapsing magnetic fields in switching from conduction in one half of the bridge to the other.

References Cited in the file of this patent

UNITED STATES PATENTS

| | | |
|---|---|---|
| 2,273,586 | Moyer | Feb. 17, 1942 |
| 2,697,197 | Brown | Dec. 14, 1954 |
| 2,821,639 | Bright et al. | Jan. 28, 1958 |
| 2,872,582 | Norton | Feb. 3, 1959 |
| 3,041,551 | Dornhoefer | June 26, 1962 |